United States Patent
Kinoshita et al.

(10) Patent No.: US 9,610,928 B2
(45) Date of Patent: Apr. 4, 2017

(54) VEHICLE BRAKE HYDRAULIC PRESSURE CONTROL APPARATUS

(71) Applicants: NISSIN KOGYO CO., LTD., Ueda-shi, Nagano (JP); HONDA MOTOR CO., LTD., Minato-ku, Tokyo (JP)

(72) Inventors: Takashi Kinoshita, Ueda (JP); Masaki Koike, Wako (JP); Kohei Akamine, Wako (JP)

(73) Assignees: HONDA MOTOR CO., LTD., Tokyo (JP); AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/861,523

(22) Filed: Sep. 22, 2015

(65) Prior Publication Data

US 2016/0075316 A1 Mar. 17, 2016

Related U.S. Application Data

(63) Continuation of application No. PCT/JP2014/058219, filed on Mar. 25, 2014.

(30) Foreign Application Priority Data

Mar. 29, 2013 (JP) ................... 2013-073316

(51) Int. Cl.
*B60T 8/24* (2006.01)
*B60T 8/42* (2006.01)
(Continued)

(52) U.S. Cl.
CPC .............. *B60T 8/245* (2013.01); *B60T 7/042* (2013.01); *B60T 8/172* (2013.01); *B60T 13/146* (2013.01);
(Continued)

(58) Field of Classification Search
CPC ........ B60T 7/042; B60T 8/172; B60T 13/662; B60T 13/686; B60T 8/245
(Continued)

(56) References Cited

U.S. PATENT DOCUMENTS 6,332,654 B1 * 12/2001 Yano ................... B60T 7/122
188/353
2007/0050120 A1 * 3/2007 Tabata ................... B60K 6/44
701/80
(Continued)

FOREIGN PATENT DOCUMENTS

| JP | 7-69102 A | 3/1995 |
|---|---|---|
| JP | 2008-92683 A | 4/2008 |
| JP | 2009-190648 A | 8/2009 |

OTHER PUBLICATIONS

International Search Report issued in PCT/JP2014/058219 on Jun. 24, 2014.
(Continued)

*Primary Examiner* — Yazan Soofi
(74) *Attorney, Agent, or Firm* — Hamre, Schumann, Mueller & Larson, P.C.

(57) ABSTRACT

A vehicle brake hydraulic pressure control apparatus installed in a vehicle changing a drive torque transferred to a wheel during a halt, includes vehicle holding section for performing vehicle holding control that holds an actual brake hydraulic pressure applied to the wheel during a halt and storage section for storing a holdable hydraulic pressure capable of holding the halt state of the vehicle before and after the drive torque changes during a halt, in which when determining that the actual brake hydraulic pressure is less than the holdable hydraulic pressure (first hydraulic pressure P1) at a start (time t1) of the vehicle holding control, the
(Continued)

vehicle holding section increases the actual brake hydraulic pressure to the holdable hydraulic pressure and holds the holdable hydraulic pressure.

7 Claims, 8 Drawing Sheets

(51) Int. Cl.
| | |
|---|---|
| *B60T 8/172* | (2006.01) |
| *B60T 13/14* | (2006.01) |
| *B60T 13/66* | (2006.01) |
| *B60T 13/68* | (2006.01) |
| *B60T 13/74* | (2006.01) |
| *B60T 7/04* | (2006.01) |

(52) U.S. Cl.
CPC .......... *B60T 13/662* (2013.01); *B60T 13/686* (2013.01); *B60T 13/745* (2013.01)

(58) Field of Classification Search
USPC .......................................................... 701/70
See application file for complete search history.

(56) References Cited

U.S. PATENT DOCUMENTS

| | | | |
|---|---|---|---|
| 2009/0021072 A1* | 1/2009 | Kobayashi | B60T 8/17636 303/163 |
| 2012/0109482 A1 | 5/2012 | Yoshii | |
| 2013/0060409 A1 | 3/2013 | Matsushita et al. | |
| 2013/0325281 A1* | 12/2013 | Terasaka | B60T 7/042 701/75 |
| 2014/0100752 A1* | 4/2014 | Ito | B60T 7/042 701/70 |
| 2014/0142828 A1* | 5/2014 | Harada | B60T 13/146 701/70 |

OTHER PUBLICATIONS

Extended European Search Report for European Application No. 14773448.7, dated Jun. 28, 2016, 7 pages.

Office Action issued for Chinese application No. 201480018786.8, dated Nov. 28, 2016, 14 pages including English translation.

* cited by examiner

VEHICLE BRAKE HYDRAULIC PRESSURE CONTROL APPARATUS

TECHNICAL FIELD

The present invention relates to a vehicle brake hydraulic pressure control apparatus.

BACKGROUND ART

Conventionally, there is a known vehicle brake hydraulic pressure control apparatus including driving force estimation section for estimating a drive torque transferred from an engine to the drive wheels of a vehicle, backward force estimation section for estimating a backward force acting on the vehicle based on a road surface gradient, and braking force addition section for adding a braking force balanced with the backward force to the wheels based on the deviation between the drive torque and the backward force estimated by the driving force estimation section and the backward force estimation section, as a vehicle brake hydraulic pressure control apparatus holding the brake hydraulic pressure so as to, for example, keep the halt state of the vehicle (see PATENT LITERATURE 1). Specifically, this technique sets the braking force so that the sum of the drive torque and the braking force equals the backward force.

CITATION LIST

Patent Literature

PATENT LITERATURE 1: JP-A-7-69102

SUMMARY OF INVENTION

Technical Problem

However, in a vehicle in which the drive torque is reduced at a halt by an idle stop or the like, it is difficult to accurately estimate the drive force that is being reduced, as needed. Accordingly, even when the vehicle is at a halt on an ascending slope with a predetermined drive torque applied, reduction in the drive torque produces a difference between the actual drive torque and the estimated drive torque, possibly causing the vehicle to slide down.

An object of the invention is to provide a vehicle brake hydraulic pressure control apparatus that can hold the halt state of the vehicle even if the drive torque changes during a halt.

Solution to Problem

The present invention that solves the above problem is a vehicle brake hydraulic pressure control apparatus installed in a vehicle changing a drive torque transferred to a wheel during a halt, the apparatus including vehicle holding section for performing vehicle holding control that holds an actual brake hydraulic pressure applied to the wheel during a halt and storage section for storing a holdable hydraulic pressure capable of holding the halt state of the vehicle before and after the drive torque changes during a halt, in which when determining that the actual brake hydraulic pressure is less than the holdable hydraulic pressure stored in the storage section at a start of the vehicle holding control, the vehicle holding section increases the actual brake hydraulic pressure to the holdable hydraulic pressure and holds the holdable hydraulic pressure.

In this structure, when the actual brake hydraulic pressure is less than the holdable hydraulic pressure considering a change in the drive torque at a start of vehicle holding control, the actual brake hydraulic pressure is increased to the holdable hydraulic pressure, so the halt state of the vehicle can be held even when the drive torque is changed during a halt.

In addition, in the above structure, when the vehicle is configured to reduce the drive torque as a brake operation amount increases, if at least a road surface gradient is an ascending gradient equal to or more than a predetermined value, the holdable hydraulic pressure can be set to a first hydraulic pressure that is constant regardless of the road surface gradient.

In such a structure, when the road surface gradient is an ascending gradient equal to or more than a predetermined value, since the brake operation amount is increased when the driver depresses the brake strongly, the drive torque becomes a very small value (for example, 0). Accordingly, when the road surface gradient is an ascending gradient equal to or more than a predetermined value, effects of a change in the drive torque during a halt do not need to be considered. Therefore, even if the holdable hydraulic pressure is set to the first hydraulic pressure, which is a constant value, the halt state of the vehicle can be held. In the structure in which the holdable hydraulic pressure is set to the first hydraulic pressure when the road surface gradient is an ascending gradient equal to or more than a predetermined value as described above, control becomes easier as compared with the structure in which, for example, the holdable hydraulic pressure is increased as the value of the road surface gradient increases when the road surface gradient is an ascending gradient equal to or more than a predetermined value.

In the above structure, when the road surface gradient is less than the predetermined value, the holdable hydraulic pressure can be set to a second hydraulic pressure that is lower than the first hydraulic pressure.

In this case, since the holdable hydraulic pressure is set to the second hydraulic pressure (lower value) when the road surface gradient is less than the predetermined value (that is, a substantially flat road or a descending gradient), a needless rise in the actual brake hydraulic pressure can be suppressed as compared with the structure in which the first hydraulic pressure (higher value) is used even in, for example, a substantially flat road or the like, thereby achieving a smooth start from a standstill.

In addition, in the above structure, when performing the vehicle holding control and other brake control different from the vehicle holding control at the same time, the vehicle holding section may set a target hydraulic pressure in the vehicle holding control to the holdable hydraulic pressure or another target hydraulic pressure calculated in the other brake control, whichever is higher.

In this case, since the target hydraulic pressure in the vehicle holding control is set to the holdable hydraulic pressure or another target hydraulic pressure calculated in the other brake control, whichever is higher, the halt state of the vehicle can be held reliably at a high hydraulic pressure.

DESCRIPTION OF EMBODIMENTS

Next, an embodiment of the present invention will be described with reference to the drawings as appropriate.

Figure 1:
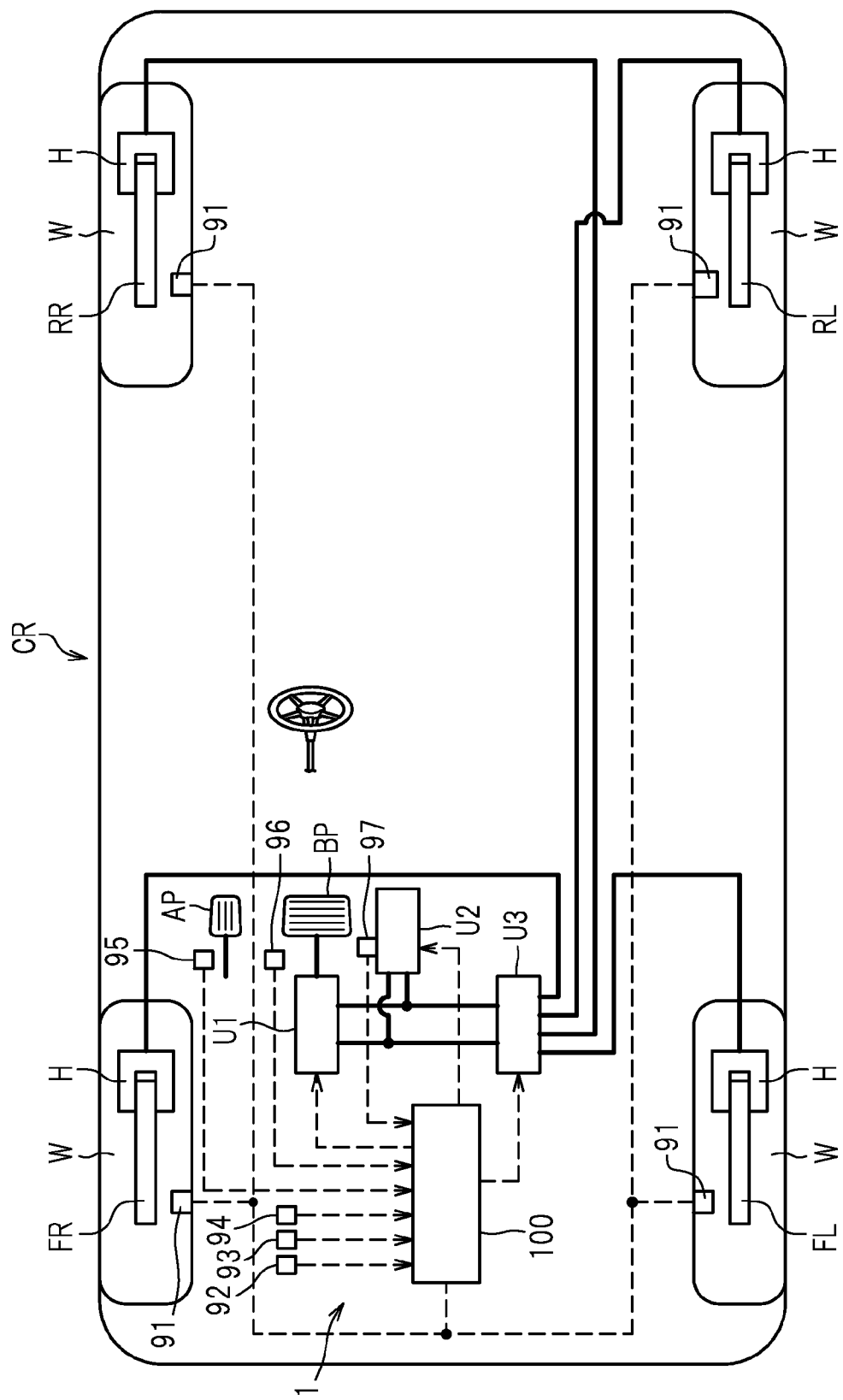
FIG. 1 is a structural diagram showing a vehicle including a control apparatus as an example of a vehicle brake hydraulic pressure control apparatus according to an embodiment of the present invention.

A brake system 1 shown in FIG. 1 to which a control apparatus 100 as a vehicle brake hydraulic pressure control apparatus according to the invention is applied is configured to include a by-wire type electric brake system (for normal use) that operates the brake by transferring an electric signal and a conventional hydraulic brake system (for fail-safe use) that operates the brake by transferring a hydraulic pressure as is generated by depressing a brake pedal BP.

Accordingly, the brake system 1 is configured to include an input apparatus U1 to which, when an operation of the brake pedal BP by the driver is performed, the operation is input, a motor cylinder apparatus U2 that generates a brake hydraulic pressure according to the amount (also referred to below as a brake operation amount) of operation of the brake pedal BP or according to necessary control, and a hydraulic pressure control unit U3 that performs brake hydraulic pressure control for assisting stabilization of vehicle behavior. The input apparatus U1, the motor cylinder apparatus U2, and the hydraulic pressure control unit U3 are configured by two systems: a first system that controls a front-right wheel brake FR and a rear-left wheel brake RL and a second system that controls a front-left wheel brake FL and a rear-right wheel brake RR. For each system, an independent connection is made by a hydraulic pressure line formed by a pipe such as, for example, a hose or tube hose. In addition, the input apparatus U1 and the motor cylinder apparatus U2 are electrically interconnected by a harness (not shown).

The brake system 1 can be installed in various types of vehicles such as, for example, a vehicle driven only by an engine (internal combustion), a hybrid vehicle, an electric vehicle, and a fuel cell vehicle. However, the brake system 1 is installed in a hybrid vehicle in the embodiment. The hybrid vehicle according to the embodiment is configured to perform an idling stop in which, for example, the engine is stopped when the vehicle CR is at a halt. That is, the vehicle CR according to the embodiment is configured so that the drive torque (creep torque) changes during a halt. In addition, the vehicle CR according to the embodiment reduces the driving torque as the brake operation amount increases to suppress concentration of electric loads on a part of the driving circuit of a driving motor by continuing to generate the drive torque (creep torque) using a driving motor during a halt.

To control vehicle behavior using an electric brake system and the hydraulic pressure control unit U3, the brake system 1 includes a wheel speed sensor 91, a steering angle sensor 92, a lateral acceleration sensor 93, a front-rear acceleration sensor 94, an accelerator pedal stroke sensor 95 for detecting the stroke of an accelerator pedal AP, a brake pedal stroke sensor 96 for detecting the stroke of the brake pedal BP, and a motor rotation angle sensor 97 in appropriate positions of the vehicle CR, and the output values of these sensors are output to the control apparatus 100. The motor rotation angle sensor 97 is a sensor that detects the rotation angle of an electric motor 42 (see FIG. 2) driving the motor cylinder apparatus U2.

The control apparatus 100 includes, for example, a CPU, a RAM, a ROM, and an input-output circuit, performs computation processes based on data or programs stored in the ROM, and controls the input apparatus U1, the motor cylinder apparatus U2, and the hydraulic pressure control unit U3 according to the output values of the respective sensors described above. This enables the control apparatus 100 to provide appropriate braking forces for wheels W by controlling the brake hydraulic pressures applied to wheel cylinders H of the wheel brakes FR, RL, FL, and RR.

Figure 2:
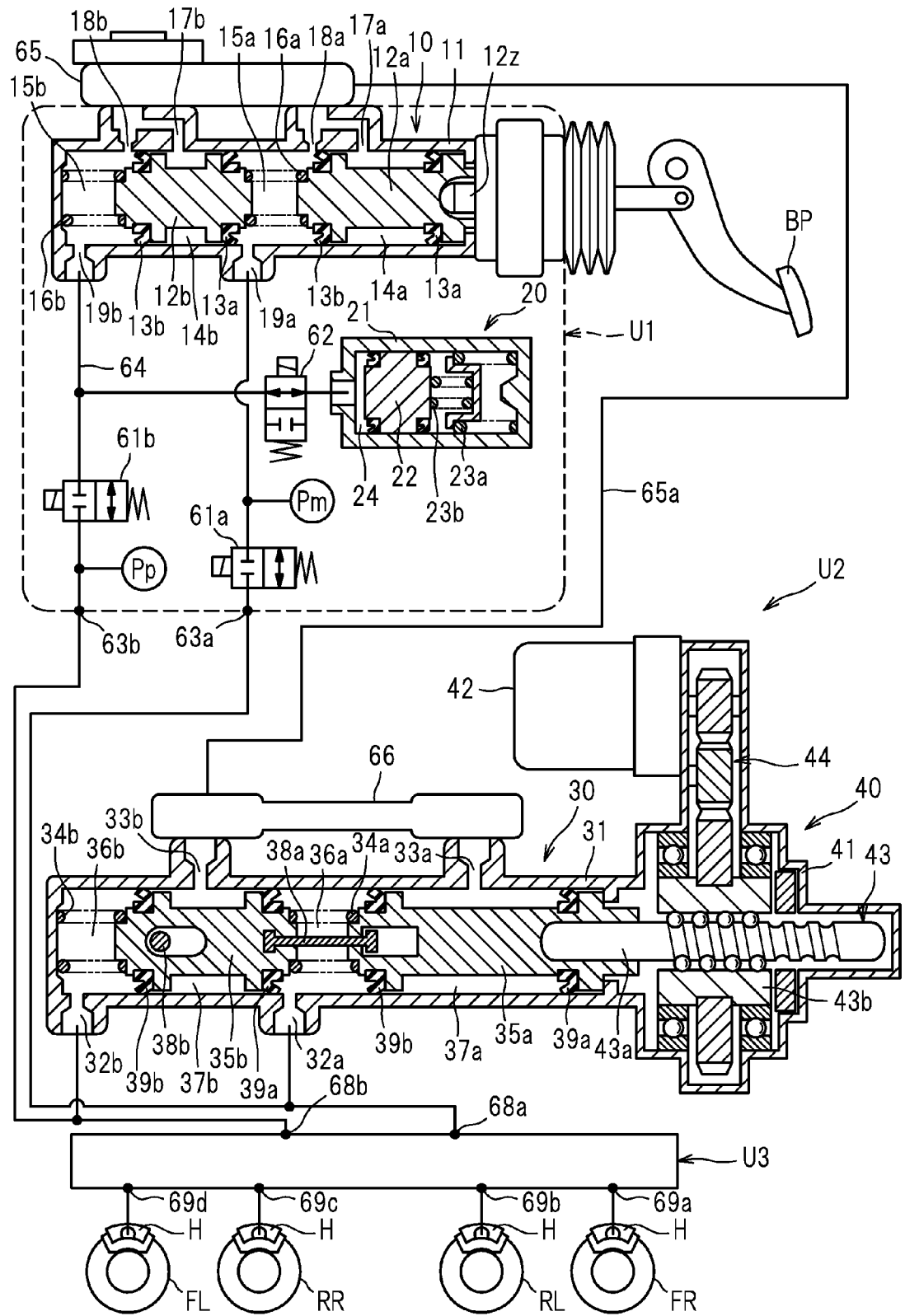
FIG. 2 is a structural diagram showing brake hydraulic pressure circuits of an input apparatus and a motor cylinder apparatus.

As shown in FIG. 2, a connection port 63a of the first system of the input apparatus U1 is connected to an output port 32a of the motor cylinder apparatus U2 and an input port 68a of the hydraulic pressure control unit U3 via pipes. Similarly, a connection port 63b of the second system is connected to an output port 32b of the motor cylinder apparatus U2 and an input port 68b of the hydraulic pressure control unit U3 via pipes.

The hydraulic pressure control unit U3 is provided with four output ports 69a to 69d and the wheel cylinders H of the wheel brakes FR, RL, FL, and RR are connected to the ports 69a to 69d, respectively.

[Input Apparatus U1]

The input apparatus U1 includes a tandem type master cylinder 10 that can generate a hydraulic pressure according to an operation of the brake pedal BP by the driver, and a first reservoir 65 attached to the master cylinder 10. In a cylinder tube 11 of the master cylinder 10, a first piston 12a and a second piston 12b are slidably disposed at a predetermined distance from each other in the axial direction of the cylinder tube 11. The first piston 12a is disposed close to the brake pedal BP and is coupled to the brake pedal BP via a push rod 12z. The second piston 12b is disposed in a position more distant from the brake pedal BP than the first piston 12a.

On each of the outer periphery surfaces of the first piston 12a and the second piston 12b, a pair of piston gaskets 13a and 13b are attached at a distance from each other in the axial direction. The section of first piston 12a between the pair of piston gaskets 13a and 13b and the section of the second piston 12b between the pair of piston gaskets 13a and 13b have smaller diameters to form back chambers 14a and 14b, respectively. The back chambers 14a and 14b are connected to the first reservoir 65 via supply ports 17a and 17b, respectively.

A first pressure chamber 15a is formed between the first piston 12a and the second piston 12b and the first pressure chamber 15a is connected to the first reservoir 65 via a relief port 18a. Similarly, a second pressure chamber 15b is formed between the second piston 12b and a side end portion of the cylinder tube 11 and the second pressure chamber 15b is connected to the first reservoir 65 via a relief port 18b. The first pressure chamber 15a and the second pressure chamber 15b each generate a brake hydraulic pressure corresponding to the force applied to the brake pedal BP when the driver depresses the brake pedal BP.

A spring 16a is provided between the first piston 12a and the second piston 12b and a spring 16b is provided between the second piston 12b and a side end portion of the cylinder tube 11. Accordingly, when the driver stops operating the brake pedal BP, the first pressure chamber 15a and the second pressure chamber 15b are returned to have appropriate volumes.

In addition, output ports 19a and 19b that correspond to and communicate with the first pressure chamber 15a and the second pressure chamber 15b are formed, respectively, on the cylinder tube 11, and the output ports 19a and 19b are connected to the connection ports 63a and 63b of the input apparatus U1 via pipes.

On a pipe interconnecting an output port 19a of the master cylinder 10 and the connection port 63a of the input apparatus U1, a normally open solenoid valve 61a is provided. On a pipe connecting an output port 19b of the master cylinder 10 and the connection port 63b of the input apparatus U1, a normally open solenoid valve 61b is provided.

A stroke simulator 20 is connected, via a normally closed solenoid valve 62, to a pipe (branch hydraulic pressure line 64) connecting the output port 19b of the master cylinder 10 and the normally open solenoid valve 61b.

The normally open solenoid valves 61a and 61b in FIG. 2 are in a normal operation state (closed state) in which the solenoid valves are energized. The normally closed solenoid valve 62 in FIG. 2 is also in a normal operation state (open state) in which the solenoid valve is energized.

The stroke simulator 20 generates the stroke of a brake and its reaction force during by-wire control and makes the driver feel as if a braking force were generated by a depression force. A piston 22 is provided in a cylinder 21 and a hydraulic pressure chamber 24 communicating with the branch hydraulic pressure line 64 via the normally closed solenoid valve 62 is formed on one side of the piston 22. The hydraulic pressure chamber 24 can absorb a brake fluid derived from the second pressure chamber 15b of the master cylinder 10.

A first return spring 23a having a high spring constant and a second return spring 23b having a low spring constant are provided in series between the piston 22 and the side end portion of the cylinder 21, so that the increase gradient of a pedal reaction force is low in an initial stage of depression of the brake pedal BP and the increase gradient of a pedal reaction force is high in a late stage of depression. Accordingly, the pedal feeling of the brake pedal BP is similar to that of existing master cylinders.

A first hydraulic pressure sensor Pm is provided in the hydraulic pressure line coupling the output port 19a of the master cylinder 10 to the normally open solenoid valve 61a and a second hydraulic pressure sensor Pp is provided in the hydraulic pressure line coupling the normally open solenoid valve 61b to the connection port 63b. The first hydraulic pressure sensor Pm measures the hydraulic pressure of the normally open solenoid valve 61a close to the master cylinder 10, which is closed during normal operation. The second hydraulic pressure sensor Pp measures the hydraulic pressure of the normally open solenoid valve 61b close to the connection port 63b (close to the hydraulic pressure control unit U3), which is closed during normal operation. The output values of these sensors are output to the control apparatus 100.

[Motor Cylinder Apparatus U2]

The motor cylinder apparatus U2 includes an actuator mechanism 40 having the electric motor 42 and a cylinder mechanism 30 operated by the actuator mechanism 40.

The actuator mechanism 40 has an actuator housing 41 and the actuator housing 41 houses a ball screw mechanism 43 including a screw shaft 43a and a nut 43b and a reduction gear train 44 transferring the rotation of the electric motor 42 to the nut 43b. The screw shaft 43a is linked to a first slave piston 35a, which will be described later.

The cylinder mechanism 30 includes a cylinder body 31 and a second reservoir 66 attached to the cylinder body 31. The second reservoir 66 is connected to the first reservoir 65 via a pipe 65a. In the cylinder body 31, the first slave piston 35a and a second slave piston 35b are disposed slidably at a predetermined distance from each other in the axial direction of the cylinder body 31. The first slave piston 35a is disposed close to the ball screw mechanism 43 so as to abut against one end of the screw shaft 43a and be movable in a longitudinal direction of the cylinder body 31 integrally with the screw shaft 43a. The second slave piston 35b is disposed in a position more distant from the ball screw mechanism 43 than the first slave piston 35a.

On each of the outer periphery surfaces of the first slave piston 35a and the second slave piston 35b, a pair of slave piston gaskets 39a and 39b are attached in a distance from each other in the axial direction. The section of first slave piston 35a between the pair of slave piston gaskets 39a and 39b and the section of the second slave piston 35b between the pair of slave piston gaskets 39a and 39b have smaller diameters to form first back chamber 37a and second back chamber 37b, respectively. The first back chamber 37a and the second back chamber 37b are connected to the second reservoir 66 via reservoir ports 33a and 33b, respectively.

A first hydraulic pressure chamber 36a is formed between the first slave piston 35a and the second slave piston 35b and a second hydraulic pressure chamber 36b is formed between the second slave piston 35b and a side end portion of the cylinder body 31. The output ports 32a and 32b that correspond to and communicate with the first hydraulic pressure chamber 36a and the second hydraulic pressure chamber 36b are formed, respectively, on the cylinder body 31. The output ports 32a and 32b are connected to the connection ports 63a and 63b of the input apparatus U1 and the input ports 68a and 68b of the hydraulic pressure control unit U3, respectively. The first hydraulic pressure chamber 36a and the second hydraulic pressure chamber 36b generate a brake hydraulic pressure when the screw shaft 43a moves toward the first slave piston 35a by the operation of the electric motor 42, and the generated hydraulic pressure is supplied to the hydraulic pressure control unit U3 via the output ports 32a and 32b.

A spring 34a is provided between the first slave piston 35a and the second slave piston 35b and a spring 34b is provided between the second slave piston 35b and a side end portion of the cylinder body 31. Accordingly, when the screw shaft 43a moves away from the first slave piston 35a by the action of the electric motor 42, the first hydraulic pressure chamber 36a and the second hydraulic pressure chamber 36b are returned to have appropriate volumes.

A restriction link 38a for restricting the maximum stroke (maximum displacement distance) and the minimum stroke (minimum displacement distance) between the first slave piston 35a and the second slave piston 35b is provided between the first slave piston 35a and the second slave piston 35b. A stopper pin 38b for restricting the sliding range of the second slave piston 35b and preventing over-returning toward the first slave piston 35 is provided in the second slave piston 35b.

[Hydraulic Pressure Control Unit U3]

Figure 3:
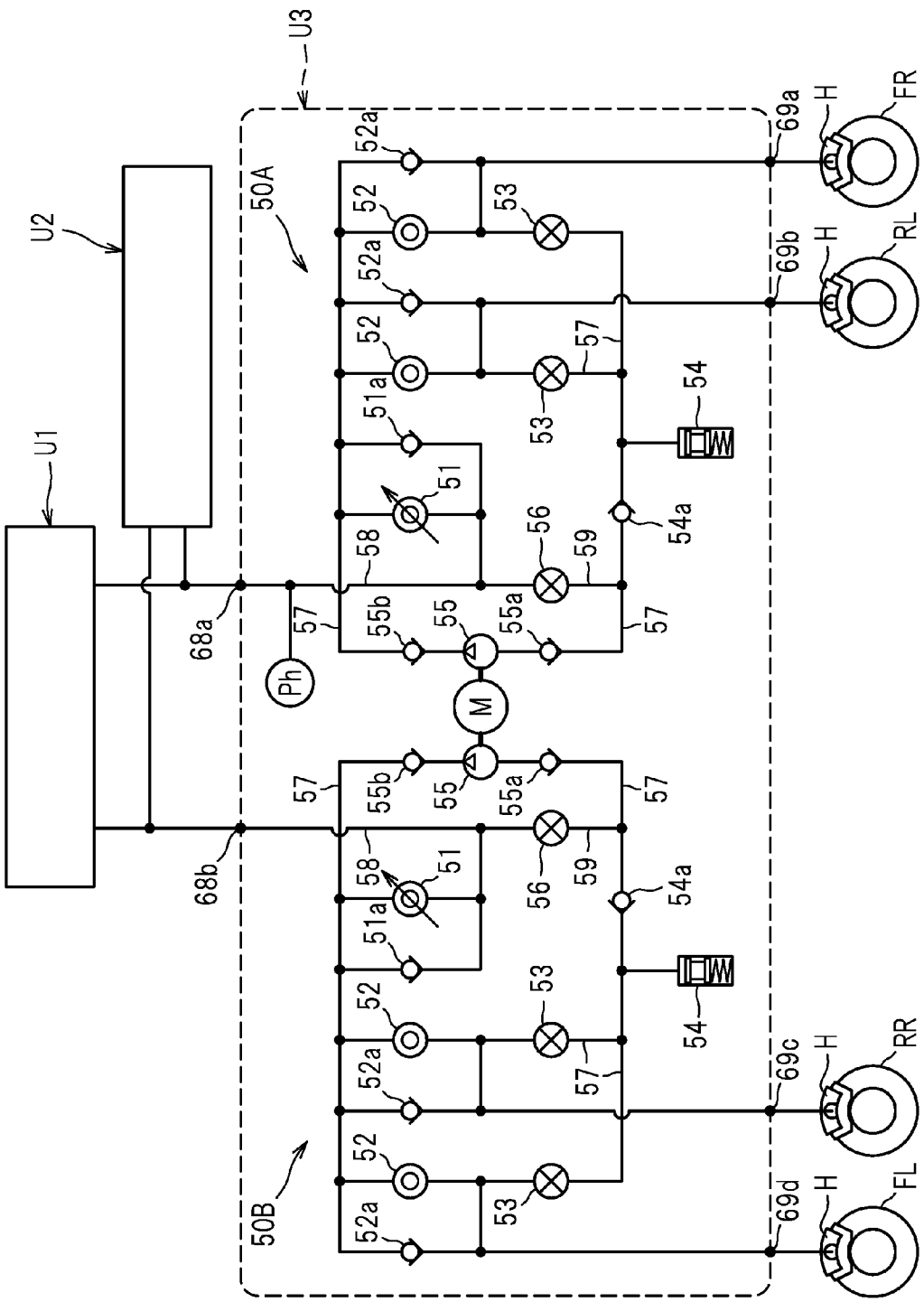
FIG. 3 is a structural diagram showing a brake hydraulic pressure circuit of a hydraulic pressure control unit.

As shown in FIG. 3, the hydraulic pressure control unit U3 is a well-known hydraulic pressure control unit and includes a first hydraulic pressure system 50A that controls the wheel brakes FR and RL and a second hydraulic pressure system 50B that controls the wheel brakes FL and RR. Since the first hydraulic pressure system 50A and the second hydraulic pressure system 50B have a similar structure, only the first hydraulic pressure system 50A will be described here and the second hydraulic pressure system 50B will not be described.

The first hydraulic pressure system 50A has a pressure regulator 51, which is a normally open proportional solenoid valve that can adjust the difference between the upstream and downstream hydraulic pressures depending on a current to be supplied, in a hydraulic pressure line connecting the input port 68a and the output ports 69a and 69b. A check valve 51a that allows only a flow toward the output ports 69a and 69b is provided in parallel with the pressure regulator 51.

The hydraulic pressure line closer to the wheel brakes RL and FR than the pressure regulator 51 is branched midway and connected to the output port 69a and the output port 69b. An inlet valve 52, which is a normally open solenoid valve, is provided in each of the positions on the hydraulic pressure line corresponding to the output ports 69a and 69b. A check valve 52a that allows only a flow toward the pressure regulator 51 is provided in parallel with each of the inlet valves 52.

From the hydraulic pressure line between the output port 69a and its corresponding inlet valve 52 and the hydraulic pressure line between the output port 69b and its corresponding inlet valve 52, a recirculation hydraulic pressure line 57 extends between the pressure regulator 51 and the inlet valve 52 via an outlet valve 53 including a normally closed solenoid valve.

On the recirculation hydraulic pressure line 57, a reservoir 54 that temporality absorbs an excess brake fluid, a check valve 54a, a check valve 55a, a pump 55, and a check valve 55b are arranged sequentially from the outlet valve 53 side. The check valves 54a, 55a, and 55b are disposed so as to allow only flows toward the line between the pressure regulator 51 and the inlet valve 52. In addition, the pump 55 is driven by a motor M and provided to generate a pressure toward the line between the pressure regulator 51 and the inlet valve 52.

An introduction hydraulic pressure line 58 interconnecting the input port 68a and the pressure regulator 51 is connected to the section between the check valve 54a and the check valve 55a in the recirculation hydraulic pressure line 57 by a suction hydraulic pressure line 59 via a suction valve 56.

In the introduction hydraulic pressure line 58, a third hydraulic pressure sensor Ph is provided only in the first hydraulic pressure system 50A. The output value of the third hydraulic pressure sensor Ph is output to the control apparatus 100.

In the hydraulic pressure control unit U3 having the above structure, the solenoid valves are not energized normally and a brake hydraulic pressure introduced from the input port 68a passes through the pressure regulator 51 and the inlet valve 52, is output to the output ports 69a and 69b, and is given to the wheel cylinders H as is. Then, when the excess brake hydraulic pressure of the wheel cylinders H is decompressed to perform anti-locking braking control, the corresponding inlet valve 52 is closed and the corresponding outlet valve 53 is opened to pass the brake fluid to the reservoir 54 through the recirculation hydraulic pressure line 57, thereby draining the brake fluid in the wheel cylinders H. When the wheel cylinders H are pressurized in the case where the driver does not operate the brake pedal BP, the suction valve 56 is opened and then the motor M is driven, so that brake fluid can be actively supplied to the wheel cylinders H by the pressurization force of the pump 55. In addition, the degree of pressurization of the wheel cylinders H can be adjusted by feeding an appropriate current through the pressure regulator 51.

Next, the control apparatus 100 will be described in detail.

Figure 4:
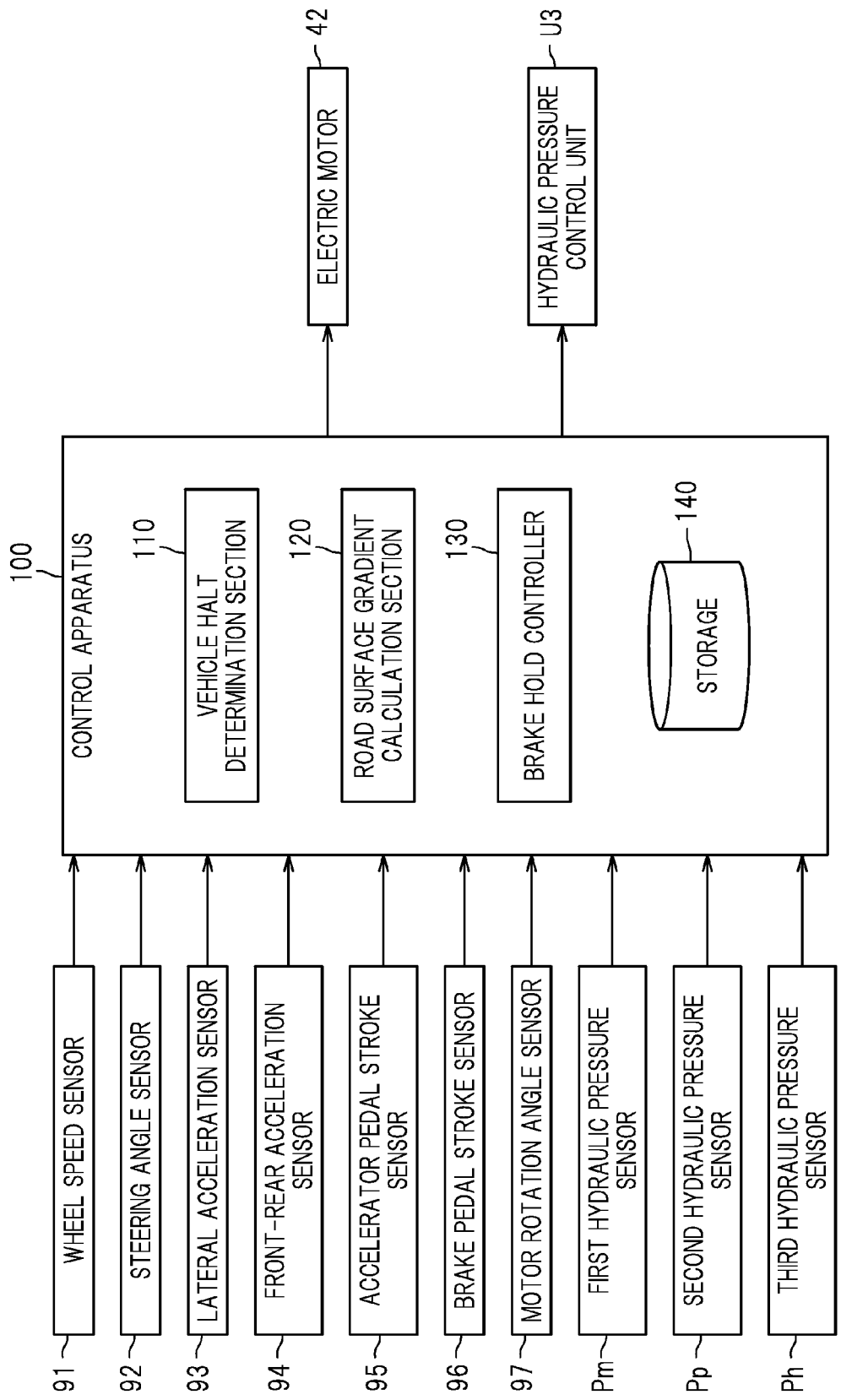
FIG. 4 is a block diagram showing the structure of the control apparatus.

As shown in FIG. 4, based on signals input from the sensors, the control apparatus 100 performs known by-wire type brake control, ABS (anti-lock brake system) control, and vehicle holding control that holds the actual brake hydraulic pressure applied to the wheels during a halt.

Specifically, the control apparatus 100 includes a vehicle stop determination section 110, a road surface gradient calculation section 120, a brake hold controller 130 as an example of the vehicle holding section (vehicle holding means), and a storage 140 as an example of the storage section (storage means).

The vehicle halt determination section 110 has a known halt determination function and, when determining that the vehicle has halted, outputs a halt signal indicating the fact to the brake hold controller 130. The halt determination may be performed by determining whether, for example, the vehicle body speed calculated based on a signal from the wheel speed sensor 91 is equal to or less than a predetermined value.

The road surface gradient calculation section 120 has a function of calculating a road surface gradient based on a signal from the front-rear acceleration sensor 94. Specifically, the road surface gradient calculation section 120 calculates a road surface gradient as a positive value when the front-rear acceleration applied to the vehicle in a halt state is an acceleration oriented to the rear (when the front of the vehicle is higher) and calculates a road surface gradient as a negative value when the front-rear acceleration is an acceleration oriented to the front (when the front of the vehicle is lower). Then, the road surface gradient calculation section 120 outputs the calculated road surface gradient to the brake hold controller 130. The road surface gradient calculation section 120 may be configured to use, as the road surface gradient, the value acquired by, for example, filtering the acceleration detected by the front-rear acceleration sensor 94.

Figure 5:
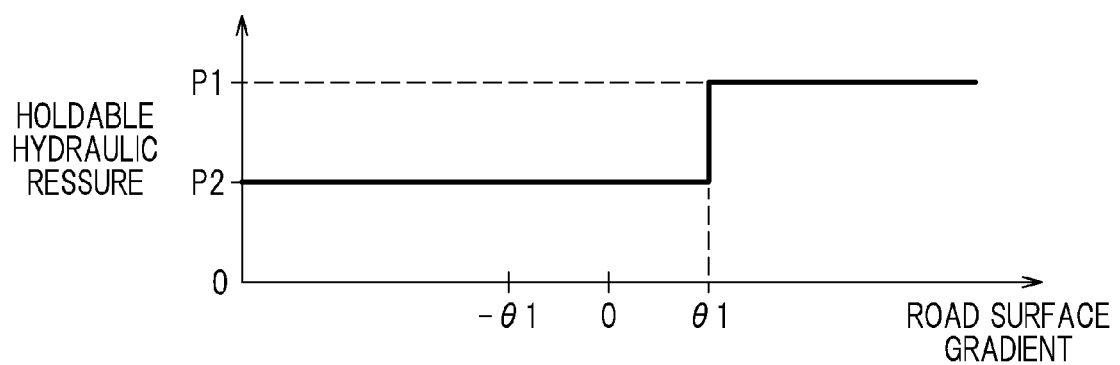
FIG. 5 is a diagram showing the relationship between a holdable hydraulic pressure and a road surface gradient.

The storage 140 stores changes in the drive torque during a halt, specifically the holdable hydraulic pressure capable of holding the halt state of the vehicle before and after reduction in the drive torque due to an idle stop. More specifically, as shown in FIG. 5, the holdable hydraulic pressure is set to a first hydraulic pressure P1, which is constant regardless of the road surface gradient, when the road surface gradient is an ascending gradient equal to or more than a predetermined value $\theta1$. When the road surface gradient is less than the predetermined value $\theta1$, the holdable hydraulic pressure is set to a second hydraulic pressure P2, which is less than the first hydraulic pressure P1 and constant regardless of the road surface gradient. The specific values of the hydraulic pressures P1 and P2 can be set appropriately based on an experiment or simulation.

The brake hold controller 130 has a function of performing vehicle holding control that holds the actual brake hydraulic pressure applied to the wheels during a halt. The brake hold controller 130 also has a function of determining whether the actual brake hydraulic pressure is less than the holdable hydraulic pressure when starting vehicle holding control. The actual brake hydraulic pressure only needs to be estimated based on, for example, the hydraulic pressure detected by the third hydraulic pressure sensor Ph or the operation history of components of the hydraulic pressure control unit U3.

When determining that the actual brake hydraulic pressure is less than the holdable hydraulic pressure, the brake hold controller 130 sets the target hydraulic pressure in vehicle holding control to the holdable hydraulic pressure, increases the actual brake hydraulic pressure to the holdable hydraulic pressure by driving the electric motor 42, and holds the actual brake hydraulic pressure to the holdable hydraulic pressure by stopping the electric motor 42.

Accordingly, when the actual brake hydraulic pressure is less than the holdable hydraulic pressure considering a change in the drive torque at a start of vehicle holding control, the actual brake hydraulic pressure is increased to the holdable hydraulic pressure, so the halt state of the vehicle can be held even when the drive torque is changed during a halt.

Next, the operation of the control apparatus 100 will be described with reference to FIG. 6.

Figure 6:
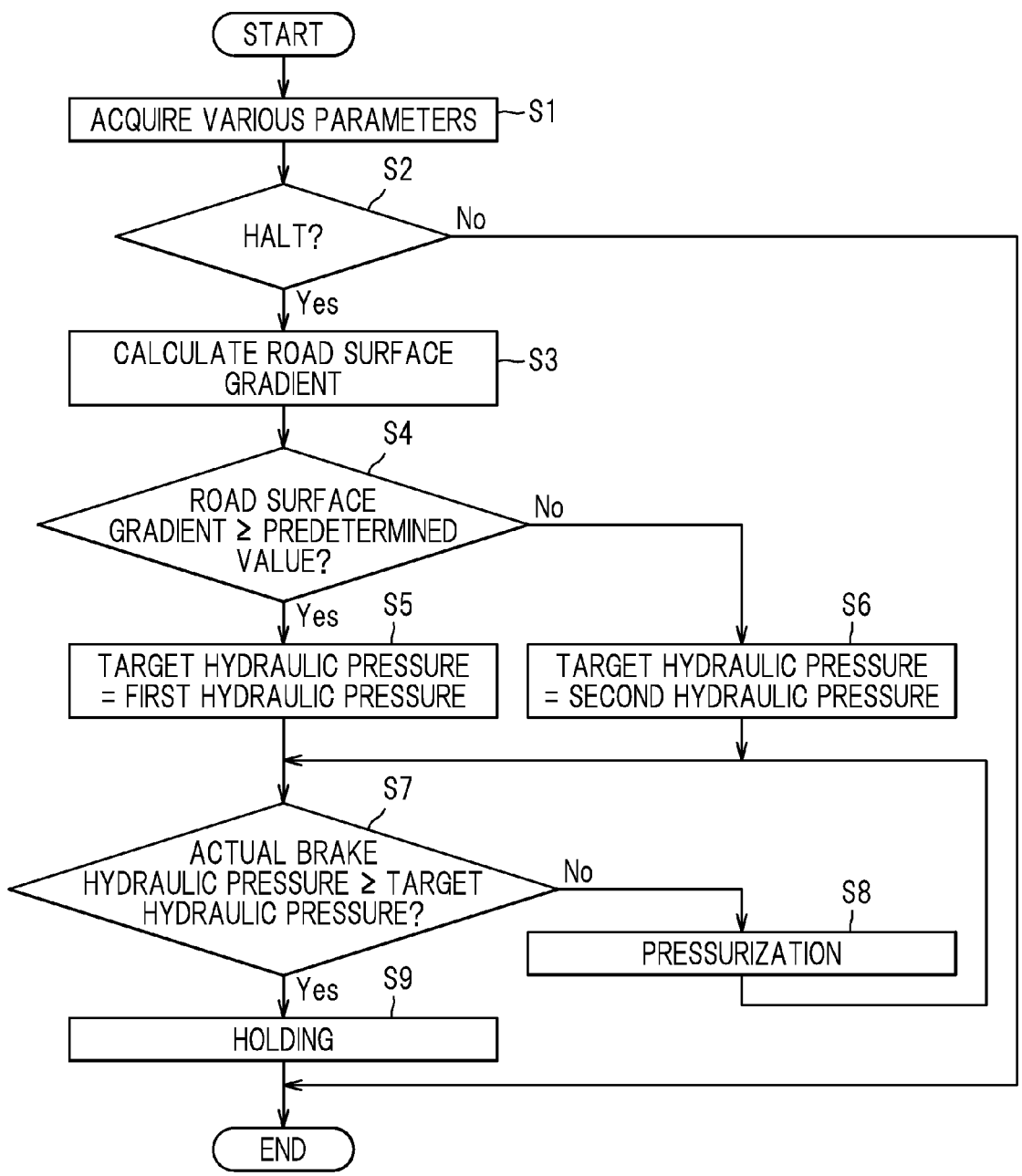
FIG. 6 is a flowchart showing the operation of the control apparatus.

The control apparatus 100 repeatedly executes the flowchart shown in FIG. 6 at all times.

In this control, the control apparatus 100 first acquires various parameters such as the wheel speed and front-rear acceleration from the sensors (S1). After step S1, the control apparatus 100 determines whether the vehicle is at a halt based on the wheel speed (S2).

When determining that the vehicle does not stop in step S2 (No), the control apparatus 100 ends the control. When determining that the vehicle is at a halt (Yes), the control apparatus 100 calculates the road surface gradient based on the front-rear acceleration (S3). After step S3, the control apparatus 100 determines whether the road surface gradient is equal to or more than the predetermined value θ1 (S4).

When determining that the road surface gradient is equal to or more than the predetermined value θ1 in step S4 (Yes), the control apparatus 100 sets the target hydraulic pressure to the first hydraulic pressure P1 (S5). When determining that the road surface gradient is less than the predetermined value θ1 (No), the control apparatus 100 sets the target hydraulic pressure to the second hydraulic pressure P2 (S6). After step S5 or step S6, the control apparatus 100 determines whether the actual brake hydraulic pressure is equal to or more than the target hydraulic pressure, that is, the actual brake hydraulic pressure is equal to or more than the holdable hydraulic pressure (S7).

In step S7, when determining that the actual brake hydraulic pressure is less than target hydraulic pressure (No), the control apparatus 100 increases the actual brake hydraulic pressure by driving the electric motor 42 (S8) and returns to the process in step S7. In step S7, when determining that the actual brake hydraulic pressure is equal to or more than target hydraulic pressure (Yes), the control apparatus 100 holds the actual brake hydraulic pressure at the target hydraulic pressure by stopping the electric motor 42 (S9) and ends the control. The actual brake hydraulic pressure held in step S9 is reduced by driving the electric motor 42 in a direction opposite to the direction in the case of pressurization when, for example, the driver depresses the accelerator pedal as in a known technique.

Next, an example of vehicle holding control by the control apparatus 100 will be described in detail with reference to FIG. 7. Specifically, vehicle holding control when a vehicle is at a halt on a road surface having a road surface gradient of the predetermined value θ1 or more will be described.

Figure 7A:
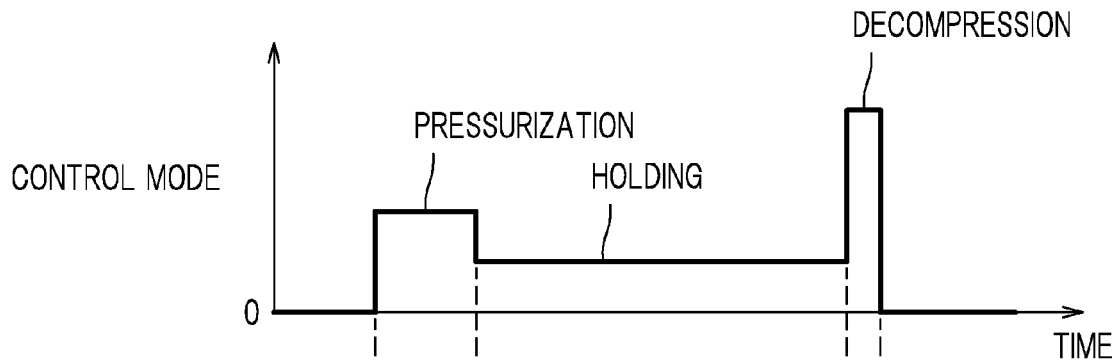
FIGS. 7 (a) to (c) show an example of changes in an actual brake hydraulic pressure and a drive torque in vehicle holding control.
Figure 7B:
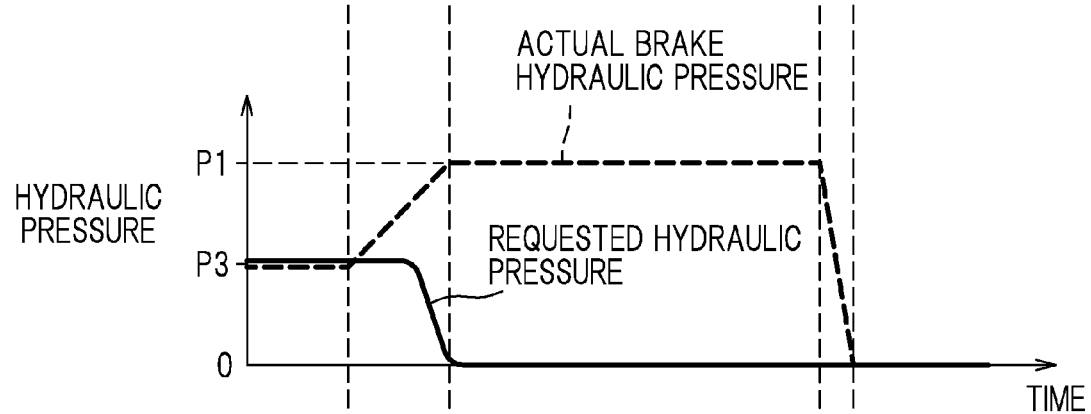
Figure 7C:
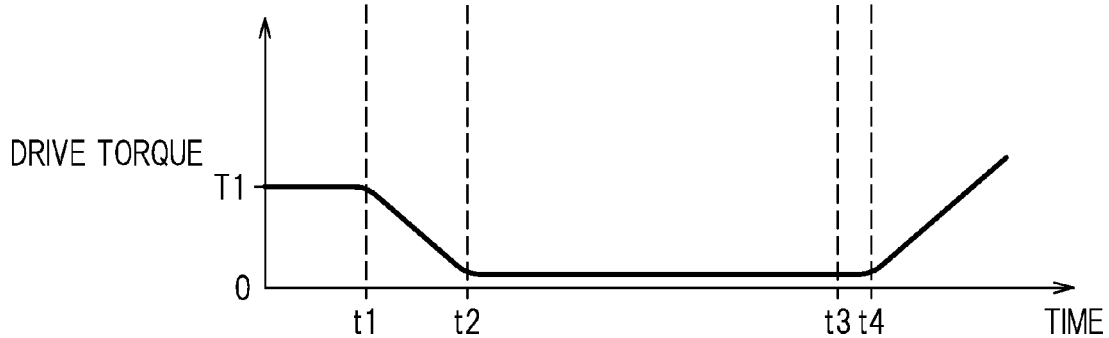

As shown in FIG. 7(c), if the drive torque is a predetermined value T1 when the vehicle is at a halt on a road surface having a road surface gradient of the predetermined value θ1 or more (time t1), the drive torque gradually reduces if the engine is stopped by an idle stop.

On the other hand, as shown in FIG. 7(a), when the vehicle is at a halt, the control apparatus 100 starts vehicle holding control (time t1). If the actual brake hydraulic pressure is a hydraulic pressure P3, which is lower than the first hydraulic pressure P1 (holdable hydraulic pressure), when the vehicle is at a halt as shown in FIG. 7(b), the control apparatus 100 sets the control mode of vehicle holding control to a pressurization mode (step S8 in FIG. 6) as shown in FIG. 7(a) to increase the actual brake hydraulic pressure. This can prevent the vehicle that has stopped once from sliding down due to reduction in the drive torque by increasing the actual brake hydraulic pressure.

When the actual brake hydraulic pressure reaches the first hydraulic pressure P1 as shown in FIGS. 7(a) and 7(b) (time t2), the control apparatus 100 sets the control mode to a holding mode to hold the actual brake hydraulic pressure at the first hydraulic pressure P1. Then, when detecting the depression of the accelerator pedal, the control apparatus 100 sets the control mode to a decompression mode (time t3), reduces the actual brake hydraulic pressure, and ends the vehicle holding control (time t4).

According to the embodiment, the following effects can be obtained in addition to the above effects.

Since the holdable hydraulic pressure is the first hydraulic pressure P1, which is a constant value, in the case of an ascending gradient having a road surface gradient of the predetermined value θ1 or more, control becomes easier than in the structure in which, for example, the holdable hydraulic pressure becomes larger with the value of the road surface gradient in the case of an ascending gradient having a road surface gradient equal to or more than the predetermined value. In a vehicle configured to reduce the drive torque with an increase in the brake operation amount as shown in the above embodiment, in the case of an ascending gradient having a road surface gradient of the predetermined value θ1 or more, since the brake operation amount is increased and the drive torque is reduced to a very small value (for example, 0) when the driver strongly depresses the brake to halt on the gradient, the drive torque is not significantly reduced from this value. Accordingly, when the road surface gradient is an ascending gradient having a road surface gradient equal to or more than the predetermined value θ1, effects of changes in the drive torque during a halt do not need to be considered. Accordingly, even if the holdable hydraulic pressure is set to the first hydraulic pressure P1, which is a constant value, the halt state of the vehicle can be held.

Since the holdable hydraulic pressure is set to the second hydraulic pressure P2 (lower value) when the road surface gradient is less than the predetermined value θ1 (that is, in the case of a substantially flat road or descending gradient), a needless rise in the actual brake hydraulic pressure can be suppressed as compared with the structure in which, for example, the first hydraulic value P1 (higher value) is used even in, for example, a substantially flat road or the like, thereby achieving a smooth start from a standstill.

The invention is not limited to the embodiment and can be used in various embodiments as illustrated below.

In the above embodiment, only the vehicle holding control that holds the actual brake hydraulic pressure regardless of whether the road surface is a descending gradient, flat road, or ascending gradient has been described. However, the invention is not limited to the embodiment and it is possible to perform other brake control different from the vehicle holding control together with the vehicle holding control. In this case, the target hydraulic pressure in the vehicle holding control is preferably set to the holdable hydraulic pressure or another target hydraulic pressure calculated in the other brake control, whichever is higher.

Figure 8:
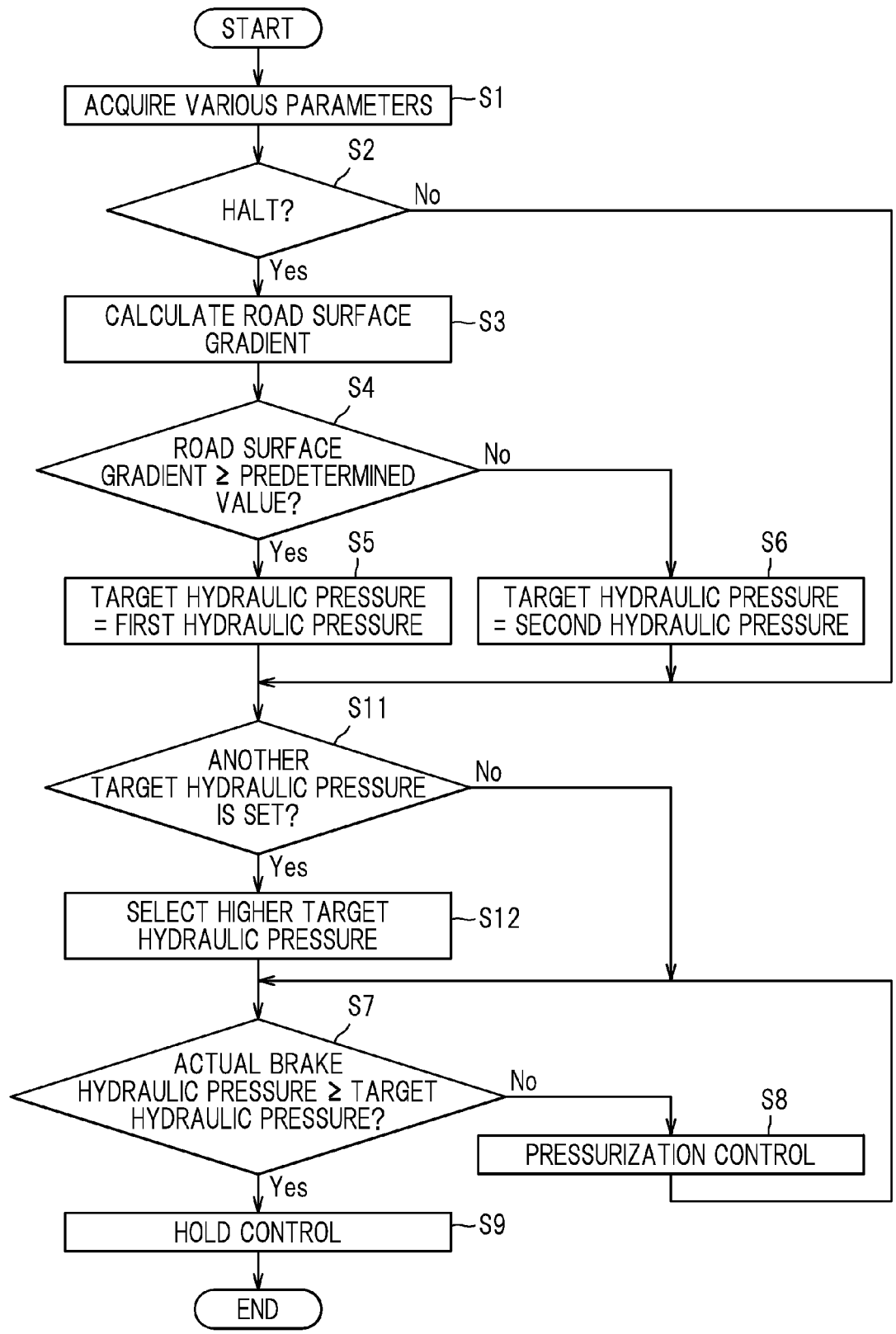
FIG. 8 is a flowchart showing the operation of a control apparatus according to a modification.

In order to perform such control, the control apparatus only needs to be operated according to, for example, a flowchart as shown in FIG. 8. In the flowchart shown in FIG. 8, new steps S11 and S12 are added between step S5 and step S7 in the flowchart shown in FIG. 6.

In step S11, the control apparatus determines whether another target hydraulic pressure is set by other brake control (for example, hill start assist control). When determining that another target hydraulic pressure has been set (Yes) in step S11, the control apparatus sets a new target hydraulic pressure to the target hydraulic pressure (holdable hydraulic pressure) set in step S5 or step S6 or the other target hydraulic pressure, whichever is higher (S12) and proceeds to the process in step S7. When determining that another target hydraulic pressure is not set in step S11 (No), the control apparatus proceeds to the process in step S7.

Since the target hydraulic pressure in the vehicle holding control is set to the holdable hydraulic pressure or another target hydraulic pressure calculated in other brake control, whichever is higher, in this method, the halt state of the vehicle can be held reliably at a high hydraulic pressure.

Although the actual brake hydraulic pressure is increased, held, and reduced by controlling the electric motor 42 in the above embodiment, the invention is not limited to the embodiment and the hydraulic pressure may be increased by, for example, driving the motor M of the hydraulic control unit U3, the hydraulic pressure may be held by controlling the current passing through the pressure regulator 51, and the hydraulic pressure may be reduced by controlling the outlet valve 53.

Although the brake system 1 is installed in a hybrid vehicle in the above embodiment, the invention is not limited to the embodiment and the brake system 1 may be installed in a vehicle or the like having an idle stop function other than hybrid vehicles.

The invention claimed is:

1. A vehicle brake hydraulic pressure control apparatus installed in a vehicle changing a drive torque transferred to a wheel during a halt, the apparatus comprising:
   vehicle holding means for performing vehicle holding control that holds an actual brake hydraulic pressure applied to the wheel during the halt; and
   storage means for storing a holdable hydraulic pressure capable of holding the halt of the vehicle before and after the drive torque changes during the halt;
   wherein, when determining that the actual brake hydraulic pressure is equal to or greater than the holdable hydraulic pressure stored in the storage means at a start of the vehicle holding control, the vehicle holding means holds the actual brake hydraulic pressure without increasing the actual brake hydraulic pressure, and when determining that the actual brake hydraulic pressures is less than the holdable hydraulic pressure, the vehicle holding means increases the actual brake hydraulic pressure to the holdable hydraulic pressure and holds the holdable hydraulic pressure.

2. The vehicle brake hydraulic pressure control apparatus according to claim 1, wherein
   the vehicle is configured to reduce the drive torque as a brake operation amount increases and
   the holdable hydraulic pressure is set to a first hydraulic pressure that is constant regardless of a road surface gradient when at least the road surface gradient is an ascending gradient equal to or more than a predetermined value.

3. The vehicle brake hydraulic pressure control apparatus according to claim 2, wherein the holdable hydraulic pressure is set to a second hydraulic pressure less than the first hydraulic pressure when the road surface gradient is less than the predetermined value.

4. The vehicle brake hydraulic pressure control apparatus according to claim 1, wherein when performing vehicle holding control and other brake control different from the vehicle holding control at the same time, the vehicle holding means sets a target hydraulic pressure to the holdable hydraulic pressure or another target hydraulic pressure calculated due to the other brake control, whichever is higher.

5. The vehicle brake hydraulic pressure control apparatus according to claim 2 wherein when performing the vehicle holding control and other brake control different from the vehicle holding control at the same time, the vehicle holding means sets a target hydraulic pressure to the holdable hydraulic pressure or another target hydraulic pressure calculated due to the other brake control, whichever is higher.

6. The vehicle brake hydraulic pressure control apparatus according to claim 3, wherein when performing vehicle holding control and other brake control different from the vehicle holding control at the same time, the vehicle holding means sets a target hydraulic pressure to the holdable hydraulic pressure or another target hydraulic pressure calculated due to the other brake control, whichever is higher.

7. The vehicle brake hydraulic pressure control apparatus according to claim 1, further comprising:
   a motor cylinder apparatus including an actuator mechanism having an electric motor; and a cylinder mechanism operated by the actuator mechanism,
   wherein the vehicle holding means causes the electric motor to drive so that the actual brake hydraulic pressure is increased to the holdable hydraulic pressure.

* * * * *